(12) United States Patent
Jin et al.

(10) Patent No.: US 9,099,216 B2
(45) Date of Patent: Aug. 4, 2015

(54) OPTICAL FIBER AND POWER LINE COMPOSITE CABLE

(71) Applicant: LS Cable & System Ltd., Anyang-si, Gyeonggi-do (KR)

(72) Inventors: Sung-Su Jin, Busan (KR); Jong-Seb Baeck, Daegu (KR); In-Ha Jung, Anyang-si (KR)

(73) Assignee: LS CABLE & SYSTEM LTD., Anyang-si, Gyeonggi-do (KR)

( * ) Notice: Subject to any disclaimer, the term of this patent is extended or adjusted under 35 U.S.C. 154(b) by 0 days.

(21) Appl. No.: 14/224,789

(22) Filed: Mar. 25, 2014

(65) Prior Publication Data

US 2015/0187463 A1 Jul. 2, 2015

(30) Foreign Application Priority Data

Dec. 30, 2013 (KR) ........................ 10-2013-0167498

(51) Int. Cl.
*H01B 9/00* (2006.01)
*G02B 6/44* (2006.01)

(52) U.S. Cl.
CPC ................ *H01B 9/005* (2013.01); *G02B 6/443* (2013.01); *G02B 6/44* (2013.01); *G02B 6/4429* (2013.01); *G02B 6/4435* (2013.01)

(58) Field of Classification Search
CPC ........ G02B 6/44; G02B 6/443; G02B 6/4429; G02B 6/4435
USPC .......................... 385/100–101, 107, 110, 112
See application file for complete search history.

(56) References Cited

U.S. PATENT DOCUMENTS

| | | | | |
|---|---|---|---|---|
| 5,261,021 | A | * | 11/1993 | Pasta et al. ..................... 385/100 |
| 6,246,821 | B1 | * | 6/2001 | Hemken et al. ................ 385/101 |
| 8,620,124 | B1 | * | 12/2013 | Blazer et al. ................... 385/102 |
| 2005/0123254 | A1 | * | 6/2005 | Oh et al. ........................ 385/101 |

* cited by examiner

*Primary Examiner* — Ryan Lepisto
*Assistant Examiner* — Guy Anderson
(74) *Attorney, Agent, or Firm* — Sherr & Jiang, PLLC

(57) ABSTRACT

The present invention relates to an optical fiber and power line composite cable comprising a cable core comprising at least one power line unit including a conductor and an insulator surrounding the conductor and at least one optical fiber unit including an optical fiber and a tube accommodating the optical fiber, a protective metal layer surrounding the cable core, and having corrugations including corrugation peaks and corrugation valleys that are alternately formed and an outer coating layer surrounding the protective metal layer, wherein a relation shown by the following formula is satisfied $D_i < D_c \leq D_o$ assuming an external diameter of the cable core as $D_c$, an internal diameter of the corrugation peak as $D_o$, and an internal diameter of the corrugation valley as $D_i$.

24 Claims, 8 Drawing Sheets

(a)

(b)

(c)

OPTICAL FIBER AND POWER LINE COMPOSITE CABLE

CROSS REFERENCE TO PRIOR APPLICATIONS

The present application claims priority under 35 U.S.C. §119 to Korean Patent Application No. 10-2013-0167498 (filed on Dec. 30, 2013), which is hereby incorporated by reference in its entirety.

BACKGROUND OF THE INVENTION

1. Field of the Invention

The present invention relates to an optical fiber and power line composite cable that is installed in a section between base station equipment and an antenna included in a mobile telecommunication base station and that includes optical fiber units and power line units to transmit a mobile telecommunication signal and power, and more particularly, to an optical fiber and power line composite cable that includes a protective metal layer surrounding optical fiber units and power line units and that is capable of preventing the power line units or the optical fiber units from moving inside the protective metal layer when the optical fiber and power line composite cable is vertically installed, compared to the related art.

2. Background Art

In the case of conventional mobile communications, communication signal is transmitted to a base station from a backbone station of a telecommunication company or the like, and a radio-frequency (RF) signal is transmitted from a base transceiver station (BTS) of the base station via an antenna of the base station. A radio signal transmitted from a user's mobile phone is transmitted to the antenna of the base station, amplified through a tower mounted amplifier (TMA), and then supplied to the BTS. In this case, the base station, the TMA, and the antenna are connected via a coaxial feeder.

However, the longer the length of a cable, the greater signal loss in the coaxial feeder. When the antenna is installed at a tower having a height of several tens of meters, signal loss occurs in the coaxial feeder that connects the antenna and the base station installed on the ground. Since the signal loss occurring in the coaxial feeder causes a signal supplied from the base station to have an intensity that is less than signal intensity required in the antenna, the supplied signal attenuates. Thus, the supplied signal needs to be amplified by the degree to which the signal attenuates in the coaxial feeder, thereby causing additional power consumption. Also, since the intensity of a signal transmitted from a mobile phone to the antenna of the base station is relatively low, it is very difficult to transmit the signal to the BTS via the coaxial feeder causing high signal loss. Accordingly, it is necessary to install a TMA at an input unit of the antenna to amplify the attenuating signal. However, since the TMA consumes a relative large amount of power to amplify the signal, high costs are incurred to perform maintenance and repair, thereby lowering system efficiency.

A remote radio unit (RRU) has been introduced to compensate for the high power consumption and inefficient maintenance and repair of the telecommunication base station using the TMA. The RRU separates an RF unit (RU) from the conventional BTS, disposes the RU on a base station tower, and remotely controls the RU. Here, RRU equipment and the remaining BTS from which the RU is separated, i.e., a baseband unit (BBU), are connected via an optical cable in which signal attenuation hardly occurs, and a power supply cable is additionally used to supply power to the RRU. Also, since the RRU is installed on the base station tower together with the antenna of the base station, the length of the coaxial feeder that connects the antenna of the base station and the RU may be minimized and the TMA need not be installed. Thus, signal amplification need not be additionally performed for a signal that attenuates in the coaxial feeder, and the efficiency of maintenance and repair performed by the base station increases. Here, an optical fiber and power line composite cable manufactured by combining an optical cable and a power supply cable is used to minimize the number of cables to be installed.

As described above, when the optical fiber and power line composite cable is installed between base station equipment and the antenna of the base station in the mobile telecommunication base station to simultaneously supply power and an optical signal, a metal layer is formed to accommodate a cable core including optical fiber units and power line units of the optical fiber and power line composite cable. However, in the related art, the cable core is surrounded with a metal layer having no corrugations or a having a corrugated tape form. In this case, when the optical fiber and power line composite cable is vertically installed, the power line units or the optical fiber units are likely to move inside the metal layer.

SUMMARY OF THE INVENTION

It is therefore an object of the present invention to provide an optical fiber and power line composite cable in which both optical fiber units configured to transmit and receive a signal and power line units configured to supply power are included to improve system efficiency.

It is another object of the present invention to provide an optical fiber and power line composite cable in which optical fiber units or power line units can be firmly installed and fixed without being separated from an outer cover even when the optical fiber and power line composite cable is vertically installed like a tower.

It is another object of the present invention to provide an optical fiber and power line composite cable in which both optical fiber units and power line units are included and a waterproof member is further included to prevent foreign substances from penetrating into the optical fiber and power line composite cable when the optical fiber and power line composite cable braches off from the at least one end portion of the optical fiber and power line composite cable The waterproof member can be used for general purposes, regardless of the size of the optical fiber and power line composite cable and the total numbers of the optical fibers and the power line units included in the optical fiber and power line composite cable.

To accomplish the above objects, an optical fiber and power line composite cable installed between base station equipment and an antenna in a mobile telecommunication base station to transmit a mobile communication signal and power, the optical fiber and power line composite cable comprises a cable core comprising at least one power line unit including a conductor and an insulator surrounding the conductor and at least one optical fiber unit including an optical fiber and a tube accommodating the optical fiber, a protective metal layer surrounding the cable core, and having corrugations including corrugation peaks and corrugation valleys that are alternately formed and an outer coating layer surrounding the protective metal layer, wherein a relation shown by the following formula is satisfied $Di<Dc \leq Do$ assuming an external diameter of the cable core as $Dc$, an internal diameter of the corrugation peak as $Do$, and an internal diameter of the corrugation valley as $Di$.

In the optical fiber and power line composite cable, wherein a relation shown by the following formula is further satisfied $D_c-2T_f<D_i$ assuming a thickness of the tube of the optical fiber unit as $T_f$.

In the optical fiber and power line composite cable, wherein a relation shown by the following formula is further satisfied $D_c-2T_p<D_i$ assuming a thickness of the insulator of the at least one power line unit as $T_p$. Further, an external diameter of the at least one optical fiber unit is formed to be less than an external diameter of the at least one power line unit.

The cable core further comprises a non-woven fabric tape surrounding the at least one power line unit and the at least one optical fiber unit The cable core further comprises a central string in a central region.

The optical fiber and power line composite cable further comprises filler filled in an empty space of the cable core.

To accomplish the above objects, an optical fiber and power line composite cable installed between base station equipment and an antenna in a mobile telecommunication base station to transmit a mobile communication signal and power, the optical fiber and power line composite cable comprises a cable core comprising a plurality of power line units each including a conductor and an insulator surrounding the conductor and a plurality of optical fiber units each including an optical fiber and a tube accommodating the optical fiber, wherein the plurality of optical fiber units are disposed in the cable core, and the plurality of power line units are disposed along the outside of the plurality of optical fiber units, a protective metal layer surrounding the cable core, and having corrugations including corrugation peaks and corrugation valleys that are alternately formed and an outer coating layer surrounding the protective metal layer, wherein a relation shown by the following formula is satisfied Di<Dc≤Do assuming an external diameter of the cable core as Dc, an internal diameter of the corrugation peak as Do, and an internal diameter of the corrugation valley as Di.

In the optical fiber and power line composite cables, a relation shown by the following formula is further satisfied $D_c-2T_p<D_i$ assuming a thickness of the insulator of the at least one power line unit as $T_p$.

The optical fiber and power line composite cable further comprises a protective layer provided between the plurality of optical fiber units and the plurality of power line units, and surrounding the plurality of optical fiber units.

The cable core further comprises a non-woven fabric tape surrounding the plurality of power line units and the plurality of optical fiber units.

The cable core further comprises a central string in a central region.

The optical fiber and power line composite cable further comprises filler filled in an empty space of the cable core.

To accomplish the above objects, an optical fiber and power line composite cable installed between base station equipment and an antenna in a mobile telecommunication base station to transmit a mobile communication signal and power, the optical fiber and power line composite cable comprises a cable core comprising a central string, a plurality of power line units each including a conductor and an insulator surrounding the conductor and a plurality of optical fiber units each including an optical fiber and a tube accommodating the optical fiber, wherein the plurality of optical fiber units and the plurality of power line units are disposed along an outer circumference of the central string, a protective metal layer surrounding the cable core, and having corrugations including corrugation peaks and corrugation valleys that are alternately formed and an outer coating layer surrounding the protective metal layer, wherein a relation shown by the following formula is satisfied Di<Dc≤Do assuming an external diameter of the cable core as Dc, an internal diameter of the corrugation peak as Do, and an internal diameter of the corrugation valley as Di.

In the optical fiber and power line composite cable, wherein a relation shown by the following formulas (2) and (3) are further satisfied, $D_c-2T_f<D_i$ and $D_c-2T_p<D_i$ assuming a thickness of the insulator of the at least one power line unit as $T_p$ and a thickness of the tube of the optical fiber unit as $T_f$.

External diameters of the plurality of optical fiber units are formed to be less than external diameters of the plurality of power line units.

In the optical fiber and power line composite cable, wherein a relation shown by the following formula is further satisfied $D_c-2(D_p-D_f)<D_i$ assuming external diameters of the plurality of power line units as $D_p$ and external diameters of the plurality of optical fiber units as $D_f$.

The optical fiber and power line composite cable further comprises filler filled in an empty space of the cable core.

To accomplish the above objects, an optical fiber and power line composite cable installed between base station equipment and an antenna in a mobile telecommunication base station to transmit a mobile communication signal and power, the optical fiber and power line composite cable comprises a cable core comprising at least one power line unit including a conductor and an insulator surrounding the conductor and at least one optical fiber unit including an optical fiber and a tube accommodating the optical fiber, a protective metal layer surrounding an outer circumference of the cable core, and having corrugations including corrugation peaks and corrugation valleys that are alternately formed and an outer coating layer surrounding the protective metal layer, wherein a connection part including at least one stepped portion is formed at least one end portion of the optical fiber and power line composite cable and the outer coating layer and the protective metal layer are sequentially removed at the connection part.

The connection part comprises a shrinkable tube, and a thickness of the at least one stepped portion on the protective metal layer is equal to or greater than a thickness of the outer coating layer.

In the optical fiber and power line composite cable as claimed in claim 19, wherein a relation shown by the following formula is satisfied $D_i<D_c\leq D_o$ (1) assuming an external diameter of the cable core as $D_c$, an internal diameter of the corrugation peak as $D_o$, and an internal diameter of the corrugation valley as $D_i$ To accomplish the above objects, an optical fiber and power line composite cable installed between base station equipment and an antenna in a mobile telecommunication base station to transmit a mobile communication signal and power, the optical fiber and power line composite cable comprises a cable core comprising, at least one power line unit including a conductor and an insulator surrounding the conductor and at least one optical fiber unit including an optical fiber and a tube accommodating the optical fiber, a protective metal layer surrounding the cable core, and having corrugations including corrugation peaks and corrugation valleys that are alternately formed and an outer coating layer surrounding the protective metal layer, wherein the at least one power line unit and the at least one optical fiber unit are exposed on at least one end portion of the optical fiber and power line composite cable, and a waterproof member is provided to guide the at least one power line unit and the at least one optical fiber unit to branch off from the at least one end portion of the optical fiber and power line composite cable, and to prevent foreign substances from penetrating into the optical fiber and power line composite cable.

The at least one power line unit and the at least one optical fiber unit are fixed with the waterproof member by inserting one end portion of the optical fiber and power line composite cable into a shrinkable tube, heating the waterproof member to a predetermined temperature, disposing a fixing unit between the at least one power line unit and the at least one optical fiber unit, and hardening the shrinkable tube.

In the optical fiber and power line composite cable, wherein a relation shown by the following formula is satisfied $D_i < D_c \leq D_o$ assuming an external diameter of the cable core as $D_c$, an internal diameter of the corrugation peak as $D_o$, and an internal diameter of the corrugation valley as $D_i$.

DETAILED DESCRIPTION OF THE EXEMPLARY EMBODIMENT

Hereinafter, exemplary embodiments of the present invention will be described in further detail with reference to the accompanying drawings. The present invention may, however, be embodied in many different forms and should not be construed as limited to the embodiments set forth herein. Rather, these embodiments are provided so that this disclosure will be thorough and complete, and fully convey the scope of the invention to those skilled in the art. Throughout the specification, the same reference numbers may be used to denote similar components in various embodiments.

Figure 1:
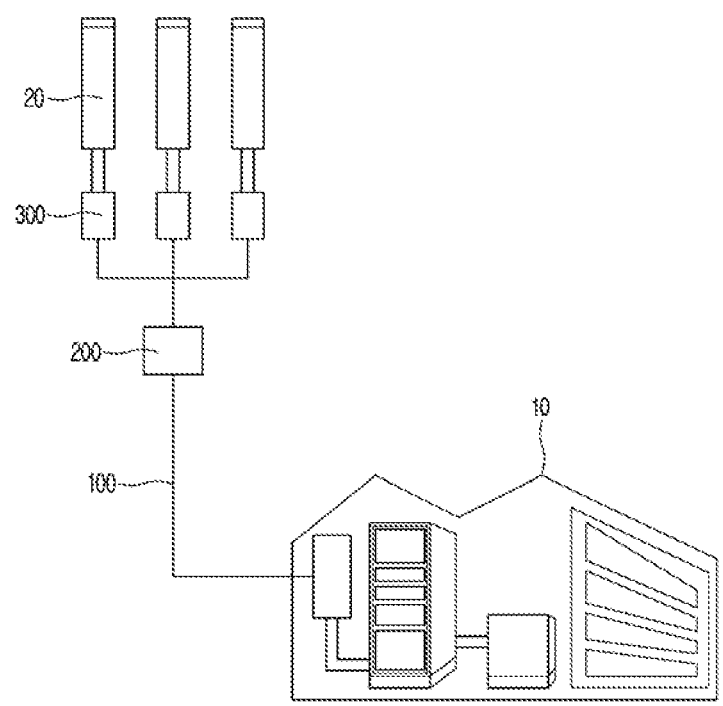
FIG. 1 is a diagram schematically illustrating the structure of a mobile telecommunication base station with an optical fiber and power line composite cable according to an embodiment of the present invention.

FIG. 1 is a diagram schematically illustrating the structure of a mobile telecommunication base station with an optical fiber and power line composite cable according to an embodiment of the present invention.

A remote radio unit (RRU) has been introduced to compensate for high power consumption of and inefficient management and recovery performed by a conventional mobile telecommunication base station using a tower mounted amplifier (TMA). A system including the RRU will be described with reference to the accompanying drawings below.

Referring to FIG. 1, the mobile telecommunication base station includes a base transceiver station (BTS) 10 configured to exchange a communication signal with a backbone station of a telecommunication company or a user's mobile phone, and to receive power from a power supply source, e.g., Korea Electric Power Corporation (KEPCO); the optical fiber and power line composite cable 100 configured to optically and electrically connect the BTS 10 and remote radio units (RRUs) 300; an outdoor terminal 200 for the optical fiber and power line composite cable 100 (hereinafter referred to as the 'terminal box 200'), through which optical fiber units and power line units are separated from the optical fiber and power line composite cable 100; the RRUs 300 configured to receive an optical signal and power from the optical fiber units and the power line units separated through the terminal box 200 or to transmit an optical signal to the optical fiber units; and antennae 20 via which a radio communication signal is received from or transmitted to the RRUs 300.

As well known, the degree of signal loss according to cable length is relatively very low in the optical fiber units each including an optical fiber, compared to a coaxial cable. Thus, when an optical signal is transmitted as close to an input unit of the antenna 20 as possible by using the optical fiber, attenuation of the optical signal may be minimized. The RRU 300 is installed adjacent to the input unit of the antenna 20 to transform the optical signal transmitted via the optical fiber into a radio-frequency (RF) signal to be radiated from the antenna 20. Thus, the degree of signal attenuation caused by loss of a signal to be supplied to the antenna 20 may be reduced to the minimum and thus the TMA that consumes a large amount of power may be omitted.

Consequently, the optical fiber and power line composite cable 100 according to the present embodiment is provided in the form of a hybrid type cable including both optical fiber units 130 connected from the BTS 10 to the RRUs 300 and each including an optical fiber and power line units 110 configured to transmit power to be supplied to the RRUs 300. When the optical fiber and power line composite cable 100 is used, the optical fiber and power line composite cable 100 is relatively easy to install at a tower with an antenna and the RRUs 300 are connected using the single terminal box 200, thereby relatively reducing installation costs, compared to a structure in which optical fiber units and power line units are separated.

The structure of the optical fiber and power line composite cable 100 will be described with reference to the accompanying drawings below.

Figure 2:
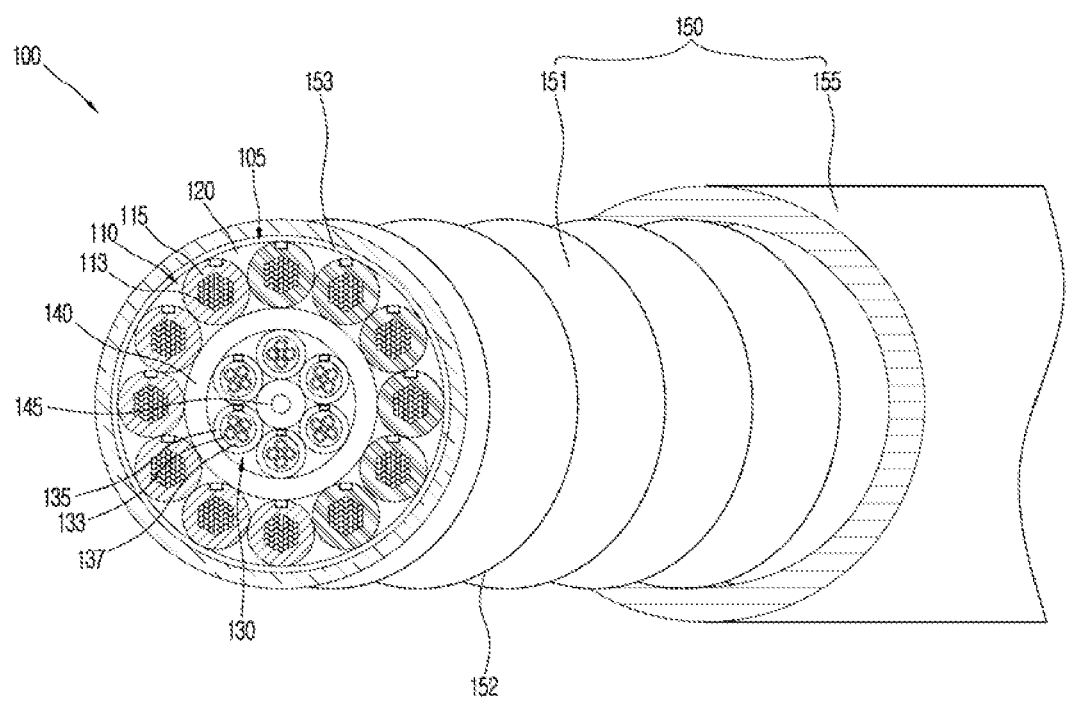
FIGS. 2 to 4 illustrate the structures of optical fiber and power line composite cables according to various embodiments of the present invention.

FIG. 2 is a perspective view illustrating the structure of an optical fiber and power line composite cable 100 according to an embodiment of the present invention.

Referring to FIG. 2, the optical fiber and power line composite cable 100 includes a cable core 105 and an outer layer 150 covering the cable core 105.

The cable core 105 may include a plurality of power line units 110 configured to supply power, and a plurality of optical fiber units 130 configured to transmit an optical signal. The cable core 105 may further include a filler 120 filled in gaps between the power line units 110 and the optical fiber units 130 and having a circular outer circumference. The outer layer 150 may include a protective metal layer 151 with corrugations 152 including a plurality of corrugation peaks 152A and a plurality of corrugation valleys 152B that are alternately formed to cover the cable core 105. The cable core 105 may further include a non-woven fabric tape 153 for wrapping an outer circumference of the cable core 105.

Each of the power line units 110 includes a plurality of conductors 113 and an insulator 115 covering the conductor 113. The power line units 110 may have a form according to general power standards. The conductors 113 may be twisted together. The conductors 113 may be formed of a metal such as copper or aluminum. The insulator 115 may be formed of polymer resin such as polyethylene, polypropylene, or polyvinyl chloride.

The optical fiber units 130 may be manufactured in any form, provided that they include an optical fiber for transmitting an optical signal. For example, the optical fiber units 130 may each include an optical fiber 133 with at least one strand and a tube 135 for accommodating the optical fiber 133. The tube 135 may be formed of, for example, poly-butylene-terephtalate (PBT), polypropylene, polyethylene, polyvinyl chloride, etc. In addition, the inside of the tube 135 may be filled with filler. For example, the inside of the tube 135 may be filled with jelly or a tensile material 137 such as aramid yarn. The tensile material 137 has high tensile strength, is flexible, and thus enables a cable to be stably installed.

The outer layer 150 is formed on an outermost side of the optical fiber and power line composite cable 100 to form an outer shape of the optical fiber and power line composite cable 100, and protects the optical fiber units 130 and the power line units 110 included in the optical fiber and power line composite cable 100.

For example, the outer layer 150 may internally contact the cable core 105, and may include the protective metal layer 151 that wraps the outer circumference of the cable core 105 in a circular shape and protects the cable core 105 from external shocks, and an outer coating layer 155 wrapping the protective metal layer 151. The protective metal layer 151 has a corrugated form in which the corrugation peaks 152A and the corrugation valleys 152B are alternately formed, and may be configured as a metal tube formed of, for example, aluminum. In order to form the protective metal layer 151, a plate type metal material is prepared together with the cable core 105 including the optical fiber units 130 and the power line units 110, the plate type metal material is then rolled up to wrap an outer side of the cable core 105, and both ends of the metal material that contact each other are fused by welding or the like, thereby manufacturing a tube having a desired diameter. Then, the tube is pressed at predetermined intervals to be outwardly corrugated. In this case, the relationship between an internal diameter $D_i$ of the corrugation valley 152B and an external diameter $D_c$ of the cable core 105 is important, as will be described in detail below.

However, if the optical fiber and power line composite cable 100 including the cable core 105 having no corrugations or covered with the protective metal layer 151 which is a corrugated tape type is used, the cable core 105 is not fixed and is likely to move when the optical fiber and power line composite cable 100 is vertically installed, as in the prior art. Also, the protective metal layer 151 according to the present embodiment may be formed of a rigid material to firmly fix the cable core 105.

The outer coating layer 155 may be formed of resin that is an eco-friendly material having flame-retardant properties. For example, the outer coating layer 155 may be formed of polyethylene, polypropylene, polyvinyl chlorine (PVC), or the like.

The cable core 105 may further include the non-woven fabric tape 153 covering the outer circumference of the cable core 105 and wrapping the power line units 110 and the optical fiber units 130 in a circular shape. The non-woven fabric tape 153 is a compressed non-woven fabric and is disposed to wrap the optical fiber units 130 and the power line units 110. The non-woven fabric tape 153 may be formed by cross-winding or vertically adding a tape type material.

In the optical fiber and power line composite cable 100, the gaps in the cable core 105 may be filled with the filler 120. That is, the power line units 110 each have a circular shape and thus gaps are present between adjacent power line units 110. In this case, the whole optical fiber and power line composite cable 100 cannot be maintained in a circular shape and is thus vulnerable to a bending force or shocks applied from the outside. Thus, when the gaps in the cable core 105 are filled with the filler 120 and an outer shape of the filler 120 is maintained in a circular shape, the whole optical fiber and power line composite cable 100 has a structure that can stand external shocks.

In the optical fiber and power line composite cable 100 of FIG. 2, the optical fiber units 130 are included in the cable core 105 and the power line units 110 are disposed along the outer circumferences of the optical fiber units 130. When the power line units 110 and the optical fiber units 130 are compared, since the optical fibers 133 included in the optical fiber units 130 are relatively more likely to be bent or broken, the optical fiber units 130 are protected by being included to be more adjacent to the center of the cable core 105 than the power unit lines 110. In this case, a protective layer 140 may be included between the power line units 110 and the optical fiber units 130 to wrap and protect the optical fiber units 130.

Also, a central string 145 may be installed in a central region of the optical fiber and power line composite cable 100 to prevent the optical fiber and power line composite cable 100 from being bent more than necessary. The central string 145 is located in the central region of the optical fiber and power line composite cable 100 to provide a repulsive force when a bending force is applied to the optical fiber and power line composite cable 100, thereby preventing the optical fiber and power line composite cable 100 from being bent more than necessary and supporting contraction of the tube 135 when a temperature changes. Accordingly, the optical fiber units 130 may be prevented from being damaged.

Figure 3:
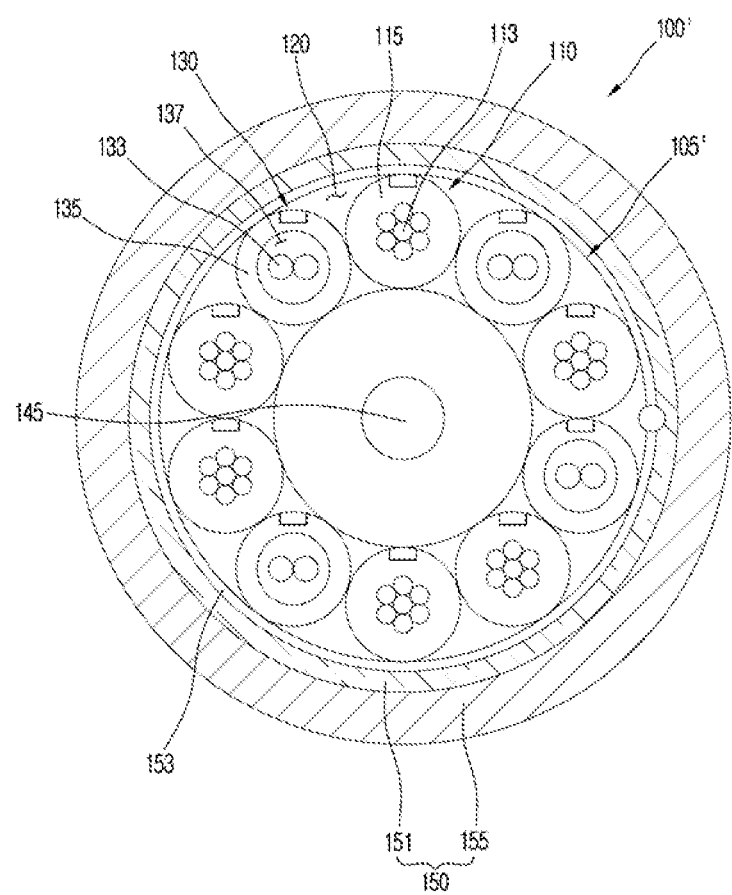
Figure 4:
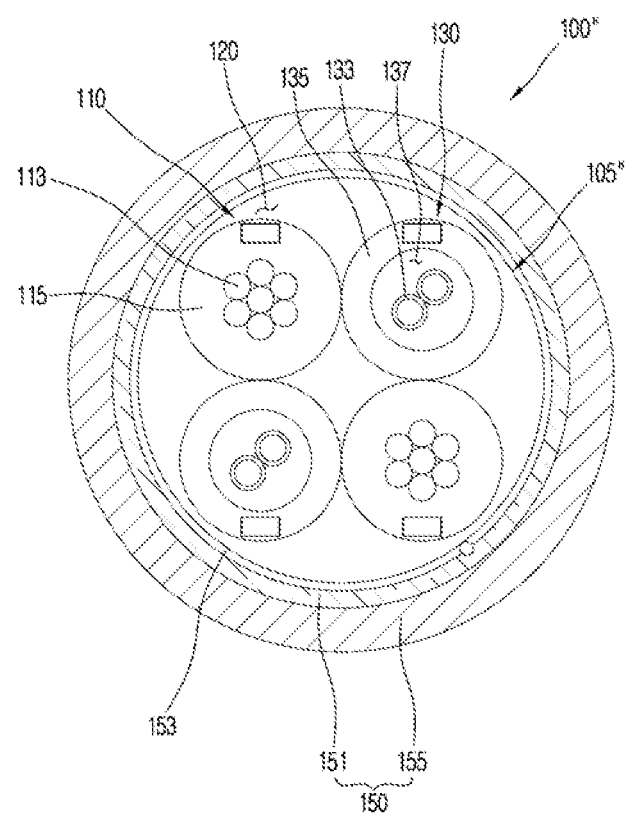

FIGS. 3 and 4 are cross-sectional views of optical fiber and power line composite cables 100' and 100" according to other embodiments of the present invention. In FIGS. 3 and 4, the same elements as those in FIG. 2 are assigned the same reference numerals and are not redundantly described here.

Referring to FIG. 3, the optical fiber and power line composite cable 100' according to another embodiment is different from the optical fiber and power line composite cable 100 according to the previous embodiment of FIG. 2 in that power line units 110 and optical fiber units 130 are aligned together along an outer circumference of a central string 145. In the optical fiber and power line composite cable 100', since the power line units 110 and the optical fiber units 130 are aligned along the outer circumference of the central string 145, the optical fiber and power line composite cable 100' may be formed to have a larger diameter than that of the optical fiber and power line composite cable 100 of FIG. 2. Thus, subsidiary materials of the existing coaxial feeder may be used during a cable laying process.

However, in the present embodiment, the optical fiber units 130 directly contact the internal diameter of corrugation valleys 152B of a protective metal layer 151. In this case, when the optical fiber units 100 are pressed against the corrugation valleys 152B, optical fibers 133 included in the optical fiber units 130 may be damaged, thereby occurring the damage of the optical fibers 133. Thus, the internal diameters of the corrugation valleys 152B may be formed to have a predetermined size compared to an external diameter of the cable core 105'. Although not shown, external diameters of the optical fiber units 130 may be formed to be less than those of the power line units 110 so that only the power line units 110 may be pressed against the corrugation valleys 152B, as will be described in detail below. A central string 145 may be installed in a central region of the optical fiber and power line composite cable 100' to prevent the optical fiber and power line composite cable 100' from being broken.

Referring to FIG. 4, the optical fiber and power line composite cable 100" according to another embodiment is similar to the optical fiber and power line composite cable 100' according to the previous embodiment of FIG. 3 in that power line units 110 and optical fiber units 130 are aligned together along an outer circumference of the cable core 105, but is different from the optical fiber and power line composite cable 100' according to the previous embodiment of FIG. 3 in that a central string is not installed in a central region of the optical fiber and power line composite cable 100".

The optical fiber and power line composite cables 100, 100', and 100" described above are basically installed in a direction perpendicular to a tower with an antenna and include a heavy weight copper conductor to transmit power. Thus, the inventor of the present application has recognized that a structure for fixing optical fiber units and power line units included in an optical fiber and power line composite cable is needed. If an optical fiber and power line composite cable including a cable core having no corrugations or covered with a corrugated tape type protective metal layer is used, the cable core is not fixed and is likely to move when this cable is vertically installed, as in the prior art.

For example, if an optical fiber and power line composite cable is installed in a direction perpendicular to a tower, when power line units or optical fiber units are separated from an outer layer of the optical fiber and power line composite cable due to the weights thereof, it takes a considerable time to install the optical fiber and power line composite cable and a process of recovering the optical fiber and power line composite cable should be performed, thereby lowering work efficiency. Thus, a structure of an optical fiber and power line composite cable designed to solve this problem will be described below.

Figure 5:
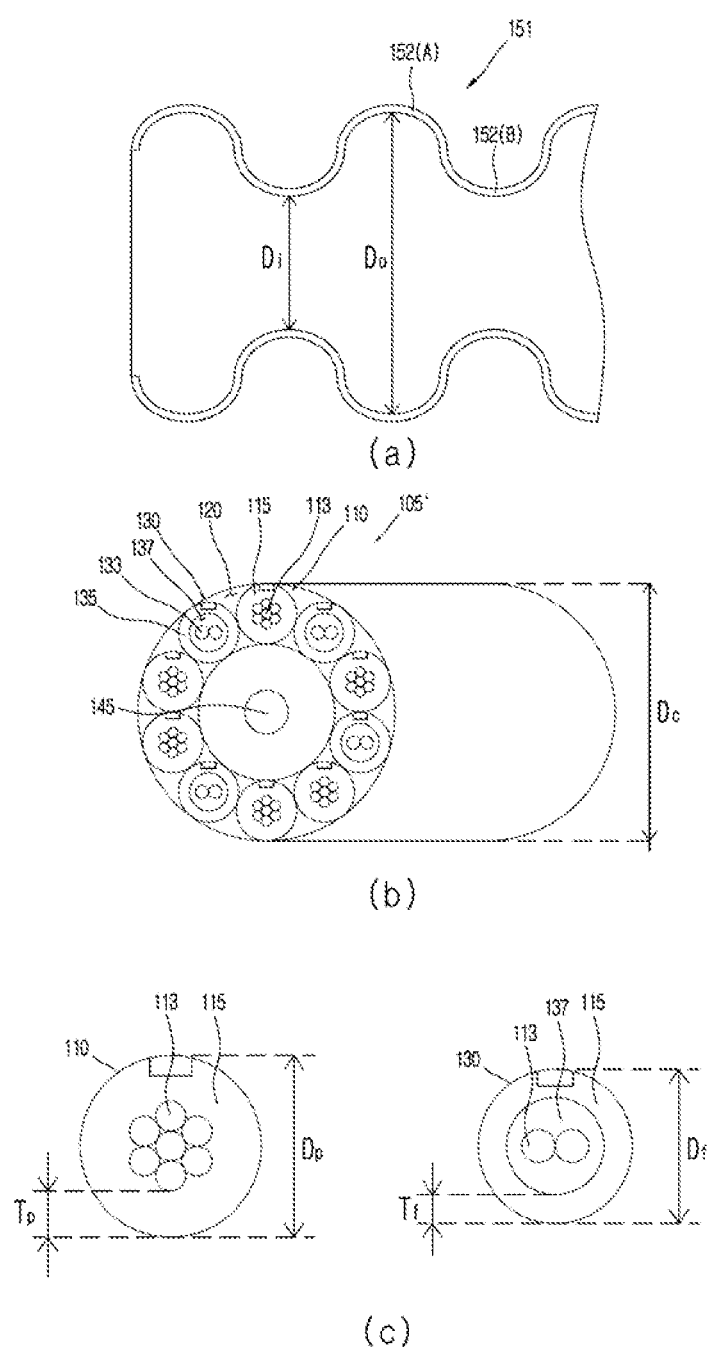
FIG. 5 illustrates a cable core and a protective metal layer illustrated in FIG. 3.

FIG. 5 illustrates the optical fiber and power line composite cable 100' of FIG. 3 among the optical fiber and power line composite cables 100, 100', and 100" described above. In detail, FIG. 5(a) is a cross-sectional view of the protective metal layer 151 of the optical fiber and power line composite cable 100', FIG. 5(b) illustrates the cable core 105' from which the protective metal layer 151 and an outer coating layer 155 are removed, and FIG. 5(c) is a cross-sectional view of an optical fiber unit 130 and a power line unit 110.

Referring to FIG. 5(a), the protective metal layer 151 is provided in the form of a metal tube formed of, for example, aluminum, and the corrugations 152 are formed such that the corrugation peaks 152A and the corrugation valleys 152B are alternately formed in a wave form as described above. In the state illustrated in FIGS. 5(a) and (b), the protective metal layer 151 is formed to surround an outer surface of the cable core 105', and the relationship among the internal diameter $D_c$ of the corrugation peak 152A and the internal diameter $D_i$ of the corrugation valley 152B of the protective metal layer 151, and the external diameter $D_c$ of the cable core 105' of the optical fiber and power line composite cable 100' acts as an important factor.

If the internal diameter $D_i$ of the corrugation valley 152B is determined to be greater than or equal to the external diameter $D_c$ of the cable core 105', an effect of fixing the cable core 105' with the corrugation valley 152B may be very low. Thus, the power line unit 110 and the optical fiber unit 130 located within the cable core 105' are not fixed and are likely to move within the outer layer 150 when the optical fiber and power line composite cable 100' is vertically installed. Accordingly, in the optical fiber and power line composite cable 100' according to the present embodiment, the internal diameter $D_i$ of the corrugation valley 152B of the protective metal layer 151 may be determined to be less than the external diameter $D_c$ of the cable core 105'. In this case, the internal diameter $D_o$ of the corrugation peak 152A may be determined to be equal to or greater than the external diameter $D_c$ of the cable core 105'. That is, the internal diameter $D_o$ of the corrugation peak 152A may be equal to or greater than the external diameter $D_c$ of the cable core 105'.

Consequently, the relationship among the internal diameter $D_o$ of the corrugation peak 152A, the internal diameter $D_i$ of the corrugation valley 152B, and the external diameter $D_c$ of the cable core 105' may be expressed as Formula 1 below.

$$D_i < D_c \leq D_o \quad \text{[Formula 1]}$$

Thus, when the corrugation peaks 152A and the corrugation valleys 152B of the protective metal layer 151 are formed, the internal diameter $D_i$ of the corrugation valleys 152A is determined to be less than the external diameter $D_c$ of the cable core 105' and the internal diameter $D_o$ of the corrugation peaks 152A is determined to be equal to or greater than the external diameter $D_c$ of the cable core 105'. Thus, the power line units 110 and the optical fiber units 130 disposed inside the cable core 105' may be fixed due to the shapes of the corrugation valleys 152B of the protective metal layer 151.

However, when the internal diameter $D_i$ of the corrugation valleys 152B of the protective metal layer 151 is less than the external diameter $D_c$ of the cable core 105' as described above, the cable core 105' is pressurized against the corrugation valleys 152B, the power line units 110 and/or the optical fiber units 130 of the cable core 105' may be damaged. Thus, the internal diameter $D_i$ of the corrugation valleys 152B of the protective metal layer 151 may be determined such that the power line units 110 and/or the optical fiber units 130 are not damaged. On the other hand, the internal diameter $D_i$ of the corrugation valleys 152B may be determined such that either the cable core 105' or the power line units 110 and/or the optical fiber units 130 are not separated from the protective metal layer 151.

As described above, the optical fiber unit 130 may include the optical fiber 133 in a central region thereof, the tensile material 137, and the tube 135. Thus, when the optical fiber unit 130 is pressurized against the corrugation valley 152B of the protective metal layer 151 to a degree that is equal to or greater than the thickness $T_f$ (see FIG. 5(c)) of the tube 135 of the optical fiber unit 130, the optical fiber 133 included in the tensile material 137 may be damaged. Furthermore, when the optical fiber units 130 are disposed along the outer circumference of the central string 145 as illustrated in FIG. 3, the optical fiber units 130 may be disposed at both sides to be symmetric to a central portion of the optical fiber and power line composite cable 100'. Thus, the corrugation valley 152B is not preferably pressurized to a degree that is equal to or greater than the thickness of the tubes 135 of the two optical fiber units 130 disposed at both sides with respect to the central region of the optical fiber and power line composite cable 100'. Thus, the internal diameter $D_i$ of the corrugation valley 152B may be determined to further satisfy Formula 2 below.

$$D_c - 2T_f < D_i \quad \text{[Formula 2]}$$

Also, as described above, the power line unit 110 may include the conductor 113 in a central region thereof and the insulator 115 covering the conductor 113. Thus, if the power line unit 110 is pressurized against the corrugation valley 152B of the protective metal layer 151, the power line unit 110 may be damaged when the power unit line 110 is pressurized against the corrugation valley 152B of the protective metal layer 151 to a degree that is equal to or greater than the thickness $T_p$ (see FIG. 5(c)) of the insulator 115 of the power line unit 110. Furthermore, as illustrated in FIG. 3, when the power line units 110 are disposed along the outer circumference of the central string 145, the power line units 110' may be disposed at both sides to be symmetric to the central region of the optical fiber and power line composite cable 100'. Thus, the power line units 110 are not preferably pressurized against the corrugation valleys 152B to a degree that is equal to or greater than the thickness $T_p$ of the insulators 115 of two power line units 110 disposed at both sides with respect to the central region of the optical fiber and power line composite cable 100'. Thus, the internal diameter $D_i$ of the corrugation valley 152B may be determined to further satisfy Formula 3 below.

$$D_c - 2T_p < D_i \quad \text{[Formula 3]}$$

As illustrated in FIGS. 3 and 4, when both the power line units 110 and the optical fiber units 130 are disposed along the outer circumference of the cable core 105' (or 105"), the optical fiber unit 130 directly contacts the internal surface of the corrugation valley 152B. In this case, when the optical fiber unit 130 is pressed against the corrugation valley 152B, the optical fiber 130 may be damaged, thereby degrading the characteristics of the optical fiber 130. Thus, as illustrated in FIG. 5(c), the external diameter $D_f$ of the optical fiber unit 130 may be set to be less than the external diameter $D_p$ of the power line unit 110 (i.e., $D_p > D_f$) so that only the power line unit 110 may be pressed against the corrugation valley 152B. In this case, the internal diameter $D_i$ of the corrugation valley 152B may be determined to be greater than a result of subtracting the square of the difference between the external diameter $D_p$ of the power line unit 110 and the external diameter $D_f$ of the optical fiber unit 130, i.e., $(D_p - D_f)$, from the external diameter $D_c$ of the cable core 105' (or 105") as shown in [Formula 4] below.

$$D_c - 2(D_p - D_f) < D_i \quad \text{[Formula 4]}$$

As described above with reference to FIG. 1, the optical fiber and power line composite cables 100, 100', and 100" are connected from the BTS 10 to the RRUs 300 via the terminal box 200. In this case, each of the optical fiber and power line composite cables 100, 100', and 100" branches into the power line units 110 and the optical fiber units 130 through the terminal box 200, and an appropriate combination of the power line units 110 and the optical fiber units 130 may be connected to the RRU 300 connected to each of the antennae 20. For example, a combination of one optical fiber unit 130 and a pair of power line units 110 is formed at an inner side of the terminal box 200, and a connection cable according to the combination of the optical fiber unit 130 and the pair of power line units 110 may be connected to the RRU 300.

Figure 6:
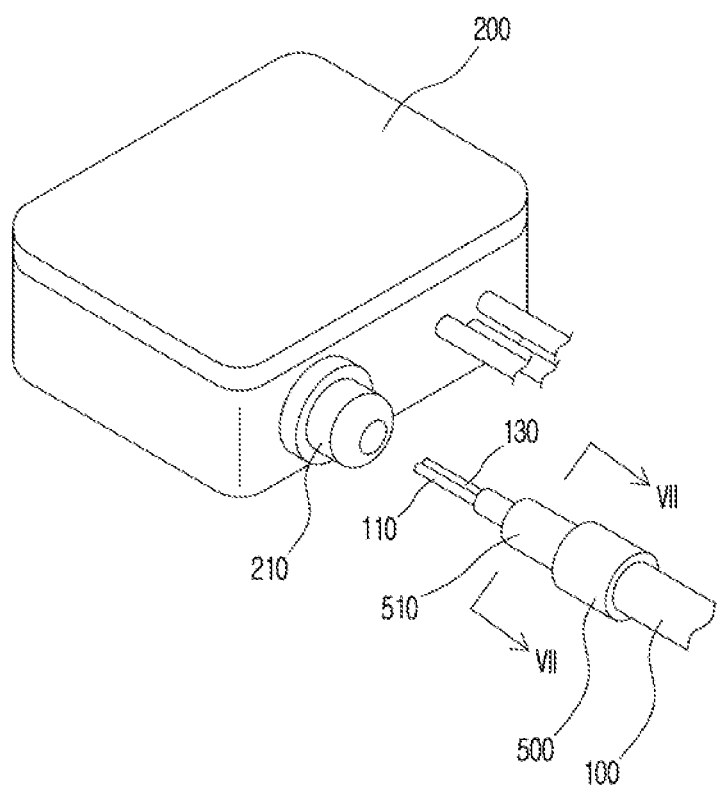
FIG. 6 is a perspective view of a terminal box to which an optical fiber and power line composite cable according to an embodiment of the present invention is connected.
Figure 7:
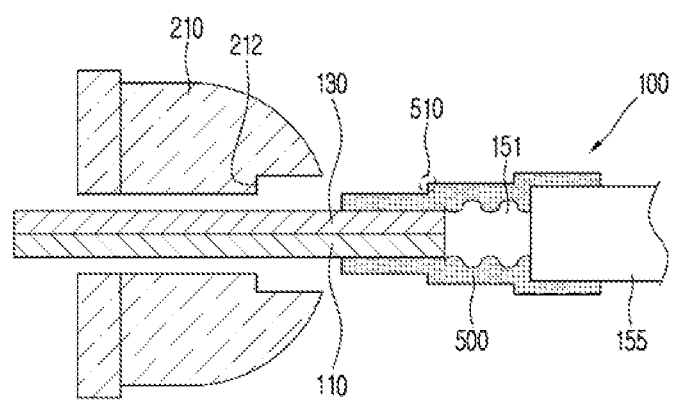
FIG. 7 is a cross-sectional view taken along line VII-VII of FIG. 6.

FIG. 6 is a perspective view of a state in which the optical fiber and power line composite cable 100 (or 100' or 100") is connected to the terminal box 200. FIG. 7 is a cross-sectional view taken along line VII-VII of FIG. 6.

Referring to FIGS. 6 and 7, the outer coating layer 155, the protective metal layer 151, and the non-woven fabric tape 153 are sequentially removed from at least one end portion of the optical fiber and power line composite cable 100, and the optical fiber and power line composite cable 100 is connected to the terminal box 200. In this case, a predetermined length of the optical fiber and power line composite cable 100 may be inserted and fixed into the terminal box 200. To this end, a connection part 500 including at least one stepped portion 510 may be installed at one end portion of the optical fiber and power line composite cable 100 to be engaged with a mounting portion 210 of the terminal box 200.

As illustrated in FIG. 7, the outer coating layer 155, the protective metal layer 151, and the non-woven fabric tape 153 are sequentially removed from the end portion of the optical fiber and power line composite cable 100, and the power line units 100 and the optical fiber units 130 included in the optical fiber and power line composite cable 100 are connected to the inside of the terminal box 200 so that the end portion of the optical fiber and power line composite cable 100 may be engaged with the mounting portion 210 of the terminal box 200. In this case, the connection part 500 is installed to fix the optical fiber and power line composite cable 100 not to be inserted into the terminal box 200 to a predetermined length or more while protecting the end portion of the optical fiber and power line composite cable 100.

The connection part 500 may be embodied, for example, as a shrinkable tube. If the connection part 500 is installed at the end portion of the optical fiber and power line composite cable 100, the at least one stepped portion 510 is formed when the outer coating layer 155, the protective metal layer 151, and the non-woven fabric tape 153 are removed from the end portion of the optical fiber and power line composite cable 100. For example, when the outer coating layer 155 is removed, the at least one stepped portion 510 is formed on the connection part 500 formed outside the protective metal layer 151. The thickness of the at least one stepped portion 510 on the protective metal layer 151 may be equal to or greater than the thickness of the outer coating layer 155. A cog portion 212 having a predetermined internal diameter may be formed in the mounting portion 210 of the terminal box 200. Here, the internal diameter of the cog portion 212 is determined to be less than the external diameter of the outer coating layer 155. Thus, when the end portion of the optical fiber and power line composite cable 100 is inserted into the mounting portion 210, the at least one stepped portion 510 of the connection part 500 is engaged with the cog portion 212, thereby fixing the optical fiber and power line composite cable 100 not to be inserted into the terminal box 200 any further.

As described above, the optical fiber and power line composite cable 100 (or 100' or 100") may branch into the optical fiber units 130 and the power line units 110 through the terminal box 200 and the optical fiber units 130 and the power line units 110 may be individually connected to the RRUs 300. In this case, a waterproof member 600 illustrated in FIG. 8 may be installed to prevent foreign substances from penetrating into points on the optical fiber and power line composite cable 100 (or 100' or 100") at which the optical fiber units 130 and power line units 110 branch off.

That is, the power line units 110 and the optical fiber units 130 are exposed from least one end portion of the optical fiber and power line composite cable 100, and the waterproof member 600 (see FIG. 8) may be installed to guide the power line units 110 and the optical fiber units 130 to branch off from the optical fiber and power line composite cable 100 (or 100' or 100") and to protect the optical fiber and power line composite cable 100 (or 100' or 100") from foreign substances. In the prior art, a waterproof member is manufactured through injection molding. However, the types, number, sizes, etc. of cables connected to antennae may depend on the structure of a base station and the type of communication equipment of a mobile telecommunication company. However, if waterproof members are manufactured according to the types of various cables, costs of manufacturing molds for injection molding may be very high when all the waterproof members are manufactured through injection molding. Accordingly, in the present embodiment, the waterproof member 600 that is easy to manufacture without using injection molding and to be combined with various combinations of cables for various cases is provided.

Figure 8:
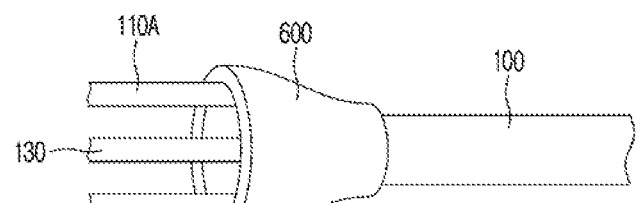
FIG. 8 is a schematic diagram illustrating a process of forming a waterproof member according to an embodiment of the present invention.
Figure 8:
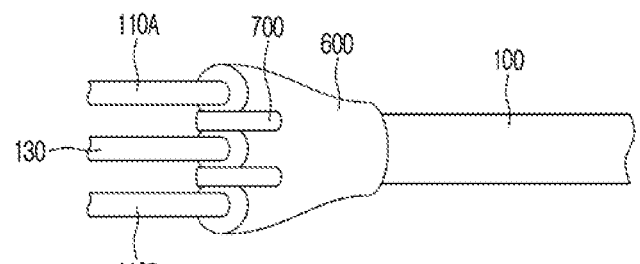
Figure 8:
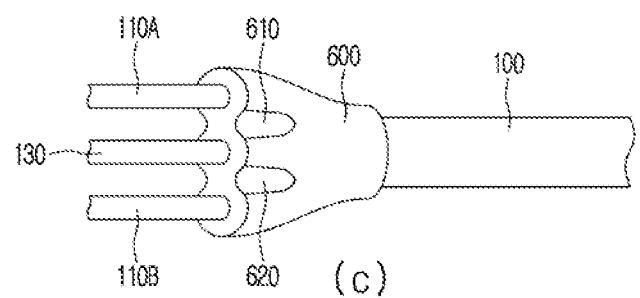

FIG. 8 is a schematic diagram illustrating a process of forming the waterproof member 600 on one end portion of an optical fiber and power line composite cable 100 according to an embodiment of the present invention.

Referring to FIG. 8(a), first, the waterproof member 600 is combined with one end portion of the optical fiber and power line composite cable 100 in which power line units 110A and 100B and an optical fiber unit 130 are exposed. Here, the waterproof member 600 may be embodied, for example, as a shrinkable tube. Thus, the optical fiber and power line composite cable 100 is inserted into one end portion of the shrinkable tube, and the power line units 110A and 100B and the optical fiber unit 130 are exposed via another end portion of the shrinkable tube. An adhesive may be applied on an inner side of the waterproof member 600 to easily unite the waterproof member 600 with the optical fiber and power line composite cable 100, before the optical fiber and power line composite cable 100 is inserted into the waterproof member 600.

Then, the waterproof member 600 is heated to a predetermined temperature. When the temperature of the waterproof member 600 is lowered, a fixing member 700 is disposed between the power line units 110A and 110B and the optical fiber unit 130 as illustrated in FIG. 8(b) before the adhesive applied on the inner side of the waterproof member 600 is hardened. The fixing member 700 may be embodied, for example, as a clip. The fixing member 700 is disposed between the power line units 110A and 110B and the optical fiber unit 130 to pressurize the waterproof member 600 to be in close contact with the optical fiber and power line composite cable 100.

When the waterproof member 600 is cooled and the fixing member 700 is removed in the state of FIG. 8(b), the waterproof member 600 shrinks and becomes in close contact with the optical fiber and power line composite cable 100, the power line units 110A and 110B, and the optical fiber unit 130 inserted thereinto as illustrated in FIG. 8(c). Also, in the connection part 600, dented portions 610 and 620 are formed between the power line units 110A and 110B and the optical fiber unit 130, thereby fixing the power line units 110A and 110B and the optical fiber unit 130 in a state they branching off from the optical fiber and power line composite cable 100.

The waterproof member 600 as described above is easy to manufacture and install regardless of the type, size, and number of cables. In particular, the waterproof member 600 is very economical since costs and a time required to manufacture molds in the prior art may be saved.

According to the one or more of the above embodiments of the present invention, an optical fiber and power line composite cable includes both optical fiber units configured to transmit and receive an optical signal and power line units configured to supply power, thereby preventing signal loss occurring when a coaxial feeder according to the prior art is used and improving whole system efficiency.

Furthermore, according to embodiments of the present invention, a corrugated tube type protective metal layer is used, and the internal diameter of the protective metal layer is set to be less than the external diameter of a cable core, thereby fixing the cable core with the protective metal layer. Thus, even if the optical fiber and power line composite cable is vertically installed at a tower or the like, the cable core of the optical fiber and power line composite cable can be firmly installed and fixed without falling down and moving due to gravity.

Also, an optical fiber and power line composite cable according to an embodiment of the present invention includes a waterproof member that prevents foreign substances, e.g., moisture, from penetrating into the optical fiber and power line composite cable when the optical fiber and power line composite cable branches into optical fiber units and power line units. The waterproof member is formed using a shrinkable tube and can thus be used for general purposes, regardless of the size of the optical fiber and power line composite cable and the total numbers of optical fiber units and power line units includes in the optical fiber and power line composite cable.

Although the present invention has been described with reference to the exemplary embodiments thereof, it would be understood by those skilled in the art that various changes and modifications may be made without departing from the technical conception and essential features of the present invention. Thus, it is clear that all modifications are included in the technical scope of the present invention as long as they include the components as claimed in the claims of the present invention.

What is claimed is:

1. An optical fiber and power line composite cable installed between base station equipment and an antenna in a mobile telecommunication base station to transmit a mobile communication signal and power, the optical fiber and power line composite cable comprising:
a cable core comprising:
at least one power line unit including a conductor and an insulator surrounding the conductor; and
at least one optical fiber unit including an optical fiber and a tube accommodating the optical fiber;
a protective metal layer surrounding the cable core, and having corrugations including corrugation peaks and corrugation valleys that are alternately formed; and
an outer coating layer surrounding the protective metal layer,
wherein a relation shown by the following formula (1) is satisfied:

$$D_i < D_c \leq D_o \quad (1)$$

assuming an external diameter of the cable core as $D_c$, an internal diameter of the corrugation peak as $D_o$, and an internal diameter of the corrugation valley as $D_i$.

2. The optical fiber and power line composite cable as claimed in claim 1, wherein a relation shown by the following formula (2) is further satisfied:

$$D_c - 2T_f < D_i \quad (2)$$

assuming a thickness of the tube of the optical fiber unit as $T_f$.

3. The optical fiber and power line composite cable as claimed in claim 1, wherein a relation shown by the following formula (3) is further satisfied:

$$D_c - 2T_p < D_i \quad (3)$$

assuming a thickness of the insulator of the at least one power line unit as $T_p$.

4. The optical fiber and power line composite cable as claimed in claim 3, wherein an external diameter of the at least one optical fiber unit is formed to be less than an external diameter of the at least one power line unit.

5. The optical fiber and power line composite cable as claimed in claim 1, wherein the cable core further comprises a non-woven fabric tape surrounding the at least one power line unit and the at least one optical fiber unit.

6. The optical fiber and power line composite cable as claimed in claim 1, wherein the cable core further comprises a central string in a central region.

7. The optical fiber and power line composite cable as claimed in claim 1, further comprising filler filled in an empty space of the cable core.

8. An optical fiber and power line composite cable installed between base station equipment and an antenna in a mobile telecommunication base station to transmit a mobile communication signal and power, the optical fiber and power line composite cable comprising:
- a cable core comprising:
  - a plurality of power line units each including a conductor and an insulator surrounding the conductor; and
  - a plurality of optical fiber units each including an optical fiber and a tube accommodating the optical fiber,
  - wherein the plurality of optical fiber units are disposed in the cable core, and the plurality of power line units are disposed along the outside of the plurality of optical fiber units;
- a protective metal layer surrounding the cable core, and having corrugations including corrugation peaks and corrugation valleys that are alternately formed; and
- an outer coating layer surrounding the protective metal layer,
- wherein a relation shown by the following formula (1) is satisfied:

$$D_i < D_c \leq D_o \qquad (1)$$

assuming an external diameter of the cable core as $D_c$, an internal diameter of the corrugation peak as $D_o$, and an internal diameter of the corrugation valley as $D_i$.

9. The optical fiber and power line composite cable as claimed in claim 8, wherein a relation shown by the following formula (3) is further satisfied:

$$D_c - 2T_p < D_i \qquad (3)$$

assuming a thickness of the insulator of the at least one power line unit as $T_p$.

10. The optical fiber and power line composite cable as claimed in claim 8, further comprising a protective layer provided between the plurality of optical fiber units and the plurality of power line units, and surrounding the plurality of optical fiber units.

11. The optical fiber and power line composite cable as claimed in claim 8, wherein the cable core further comprises a non-woven fabric tape surrounding the plurality of power line units and the plurality of optical fiber units.

12. The optical fiber and power line composite cable as claimed in claim 8, wherein the cable core further comprises a central string in a central region.

13. The optical fiber and power line composite cable as claimed in claim 8, further comprising filler filled in an empty space of the cable core.

14. An optical fiber and power line composite cable installed between base station equipment and an antenna in a mobile telecommunication base station to transmit a mobile communication signal and power, the optical fiber and power line composite cable comprising:
- a cable core comprising:
  - a central string;
  - a plurality of power line units each including a conductor and an insulator surrounding the conductor; and
  - a plurality of optical fiber units each including an optical fiber and a tube accommodating the optical fiber,
  - wherein the plurality of optical fiber units and the plurality of power line units are disposed along an outer circumference of the central string;
- a protective metal layer surrounding the cable core, and having corrugations including corrugation peaks and corrugation valleys that are alternately formed; and
- an outer coating layer surrounding the protective metal layer,
- wherein a relation shown by the following formula (1) is satisfied:

$$D_i < D_c \leq D_o \qquad (1)$$

assuming an external diameter of the cable core as $D_c$, an internal diameter of the corrugation peak as $D_o$, and an internal diameter of the corrugation valley as $D_i$.

15. The optical fiber and power line composite cable as claimed in claim 14,
wherein a relation shown by the following formulas (2) and (3) are further satisfied:

$$D_c - 2T_f < D_i \qquad (2)$$

$$D_c - 2T_p < D_i \qquad (3)$$

assuming a thickness of the insulator of the at least one power line unit as $T_p$ and a thickness of the tube of the optical fiber unit as $T_f$.

16. The optical fiber and power line composite cable as claimed in claim 14, wherein external diameters of the plurality of optical fiber units are formed to be less than external diameters of the plurality of power line units.

17. The optical fiber and power line composite cable as claimed in claim 16, wherein a relation shown by the following formula (4) is further satisfied:

$$D_c - 2(D_p - D_f) < D_i \qquad (4)$$

assuming external diameters of the plurality of power line units as $D_p$ and external diameters of the plurality of optical fiber units as $D_f$.

18. The optical fiber and power line composite cable as claimed in claim 14, further comprising filler filled in an empty space of the cable core.

19. An optical fiber and power line composite cable installed between base station equipment and an antenna in a mobile telecommunication base station to transmit a mobile communication signal and power, the optical fiber and power line composite cable comprising:
- a cable core comprising:
  - at least one power line unit including a conductor and an insulator surrounding the conductor; and
  - at least one optical fiber unit including an optical fiber and a tube accommodating the optical fiber;
- a protective metal layer surrounding an outer circumference of the cable core, and having corrugations including corrugation peaks and corrugation valleys that are alternately formed;
- an outer coating layer surrounding the protective metal layer; and
- a connection part formed at an end portion of the optical fiber and power line composite cable,
- wherein the outer coating layer and the protective metal layer are sequentially removed at the end portion of the optical fiber and power line composite cable where the connection part is formed such that a part of the cable core, an end of the protective metal layer, and an end of the outer coating layer are covered by the connection part, wherein the connection part includes at least one stepped portion formed on an outer circumference of the connection part and reducing an outer diameter of the connection part where the outer coating layer and the protective metal layer are removed.

20. The optical fiber and power line composite cable as claimed in claim 19, wherein the connection part comprises a shrinkable tube, and
a thickness of the at least one stepped portion on the protective metal layer is equal to or greater than a thickness of the outer coating layer.

21. The optical fiber and power line composite cable as claimed in claim 19, wherein a relation shown by the following formula (1) is satisfied:

$$D_i < D_c \leq D_o \quad (1)$$

assuming an external diameter of the cable core as $D_c$, an internal diameter of the corrugation peak as $D_o$, and an internal diameter of the corrugation valley as $D_i$.

22. An optical fiber and power line composite cable installed between base station equipment and an antenna in a mobile telecommunication base station to transmit a mobile communication signal and power, the optical fiber and power line composite cable comprising:
a cable core comprising:
at least one power line unit including a conductor and an insulator surrounding the conductor; and
at least one optical fiber unit including an optical fiber and a tube accommodating the optical fiber;
a protective metal layer surrounding the cable core, and having corrugations including corrugation peaks and corrugation valleys that are alternately formed; and
an outer coating layer surrounding the protective metal layer
wherein the at least one power line unit and the at least one optical fiber unit are exposed on at least one end portion of the optical fiber and power line composite cable, and
a waterproof member is provided to guide the at least one power line unit and the at least one optical fiber unit to branch off from the at least one end portion of the optical fiber and power line composite cable, and to prevent foreign substances from penetrating into the optical fiber and power line composite cable.

23. The optical fiber and power line composite cable as claimed in claim 22, wherein the at least one power line unit and the at least one optical fiber unit are fixed with the waterproof member by inserting one end portion of the optical fiber and power line composite cable into a shrinkable tube, heating the waterproof member to a predetermined temperature, disposing a fixing unit between the at least one power line unit and the at least one optical fiber unit, and hardening the shrinkable tube.

24. The optical fiber and power line composite cable as claimed in claim 22, wherein a relation shown by the following formula (1) is satisfied:

$$D_i < D_c \leq D_o \quad (1)$$

assuming an external diameter of the cable core as $D_c$, an internal diameter of the corrugation peak as $D_o$, and an internal diameter of the corrugation valley as $D_i$.

* * * * *